July 28, 1970  J. H. WEATHERBY  3,521,730
CLUTCH BRAKE HAVING POSITIVE OUTPUT POSITION SELECTION
Filed June 21, 1968  2 Sheets-Sheet 1

INVENTOR
JOHN H. WEATHERBY
BY
Howson & Howson
ATTYS

July 28, 1970   J. H. WEATHERBY   3,521,730
CLUTCH BRAKE HAVING POSITIVE OUTPUT POSITION SELECTION
Filed June 21, 1968   2 Sheets-Sheet 2
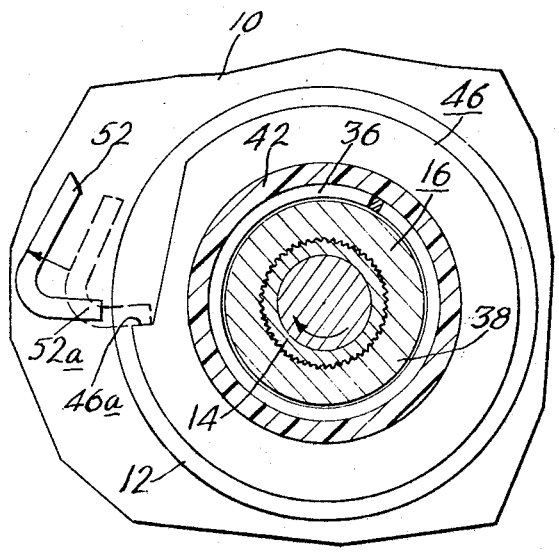
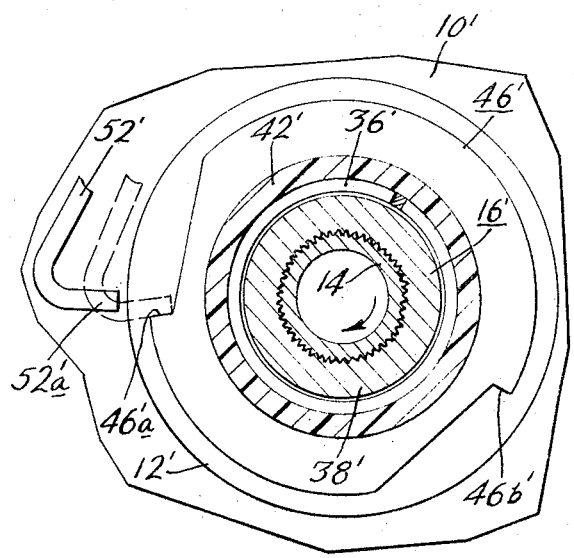
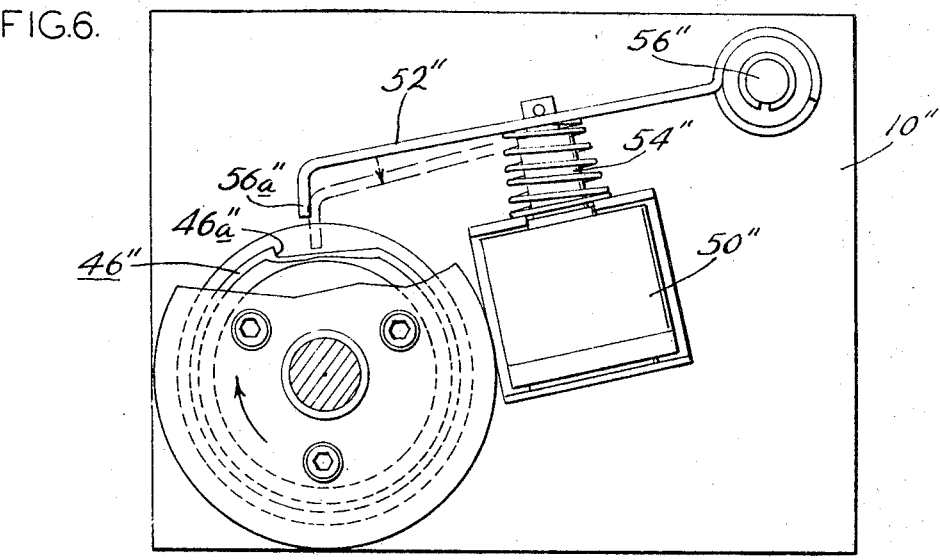
INVENTOR:
JOHN H. WEATHERBY
BY
Howson & Howson
ATTYS United States Patent Office 3,521,730
Patented July 28, 1970

3,521,730
CLUTCH BRAKE HAVING POSITIVE OUTPUT
POSITION SELECTION
John H. Weatherby, Sewell, N.J., assignor to Precision
Specialties, Inc., Pitman, N.J., a corporation of Missouri
Filed June 21, 1968, Ser. No. 738,937
Int. Cl. F16d 67/06
U.S. Cl. 192—12
11 Claims

ABSTRACT OF THE DISCLOSURE

A clutch brake structure is provided wherein the output may be stopped at any desired rotational position of its output. The clutch employs a conventional helical clutch spring having input and output hubs which are normally engaged by the spring to drive the output from the input. The spring is connected between a clutch control member and the output hub. Brake means is provided to stop the output hub and the clutch control member relative to the frame. The brake means is preferably a helical spring device, similar to the clutch spring connected between the output hub and the brake control member so that the brake control member rotates with the output hub. This preferred brake means is effective when the brake control member is stopped and causes or allows the brake spring to wrap down and connect the output hub to the frame. The brake means also acts essentiallly simultaneously to stop the clutch control member and permit the clutch spring to be unwound from the input hub as the input hub continues to rotate. A single revolution clutch provides a shoulder on the brake control member against which a removable stop rests. The stop is momentarily removed as desired to release the brake and engage the clutch and stops the system one revolution later, or at some intermediate shoulder. Preferably the stop is provided on a separate stop collar which is connected to the brake control member by a helical spring clutch.

This invention relates to a novel clutch brake which is particularly adaptable to use as a positive stop clutch for stopping an output very precisely at a predetermined rotational position. In accordance with the present invention the clutch brake not only immediately stops when desired but stops the output at any preselected position each rotation of the output, or as often as desired.

U.S. Pat. No. 3,425,526 to John S. Baer; for Clutch Brake a clutch brake discloses which permits positive stopping of an output at the position of clutch disengagement. This clutch is an improvement of a clutch described in U.S. Pat. No. 3,349,880. This is accomplished by braking to a stop relative to a frame a clutch control member and allowing the output hub of the clutch to rotate a short, predetermined angle beyond the clutch control member sufficient to disengage the clutch spring. A preferred means of stopping the clutch control member according to this earlier invention employs a rotatable brake hub fixed to and rotatable with the clutch control member and a cooperating helical brake spring which is fixed between the frame and a brake control member. This brake spring is normally out of engagement with the rotatable brake hub but is moved into engagement with the brake hub by rotating the brake control member relative to the frame to wrap the brake spring down on the brake hub. The hand of the brake spring is such that when it engages the rotatable brake hub the rotation will tend to wrap the brake spring tighter around the hub and immediately stop the brake hub relative to the frame.

The prior Baer structure described has proved valuable in many new applications. However, the output of this prior clutch brake has lacked the ability to stop or index precisely at a given rotational position.

The present invention by contrast relates to a clutch brake which is adaptable to stopping or indexing the output at any preselected position or positions in the course of rotation. In fact, the present invention lends itself to use as a single revolution clutch permitting its output to start upon demand and rotate precisely a single revolution, stopping exactly at the same position of the output.

The present invention may also provide a device which, upon demand, rotates a predetermined part of a full revolution and stops at a precise predetermined position. In a two stop embodiment, on demand it will then rotate back to its original position and stop. Alternatively more than two stops may be used and it may repeatedly stop at each of the same series of predetermined positions, starting again upon demand.

Another application for the clutch brake of the present invention is to stop its output at a precise rotational position after any number of revolutions.

The present invention also provides a clutch brake of highly simplified construction requiring fewer and less complicated parts for its construction.

Most broadly the present invention concerns a clutch brake in which a frame is provided relative to which are supported input and output hubs. The input hub is connectable to a suitable drive means and provided with a coaxial cylindrical clutch surface. The output hub is axially aligned with the input hub and connectable to driven apparatus. A helical clutch spring is generally coaxial with and normally in engagement with at least the cylindrical clutch surface of the input hub. One end of the clutch spring is fixed to the output hub and the other end is fixed to a clutch control member. The clutch control member acts, when rotated relative to the output hub in the direction to unwrap the clutch spring from the input hub, to thereby disengage the input and output hubs from one another. The hand of the clutch spring is selected to cause the clutch spring to wrap tighter on the input hub as the result of driving by the input hub. Brake means on the frame acts upon the output hub to stop the said hub relative to the frame. Actuator means on the frame operates essentially simultaneously on the clutch control member and on the brake means to unwrap the clutch spring from the input hub and brake the output hub.

In a preferred embodiment the brake includes a frame hub fixed to the frame and having a cylindrical surface coaxial with the axis of rotation of the input and output hubs. A helical brake spring connected at one end to the output hub surrounds at least part of the frame hub and is normally out of engagement with the frame hub. A brake control member rotatable relative to the frame is affixed to the other end of the brake spring. Relative rotational movement of the output hub with respect to the brake control member in the proper direction causes the brake spring to wrap down into contact with the frame hub. The brake spring is of such hand as to tend to wrap more tightly around the cylindrical surface of the frame hub as the result of rotation of the output hub with respect to the brake control member and thereby positively stop all rotation of the output hub.

In order to make this structure a positive stop clutch it is merely necessary to provide at least one rotatable stop on the brake control means and intercepting stop means movable into the path of the rotatable stop. If the stops are opposed, the output hub will be held indexed in known rotational position until the intercepting stop is removed to release the rotatable stop and permit the brake control means to move. Interposing the brake control member before the next rotatable stop will again stop the output hub in the desired rotational position.

For a better understanding of the present invention reference is made to the following drawings in which FIG. 1 is an elevational view of a clutch brake in accordance with the present invention shown with the clutch engaged;

FIG. 4 is a section taken on line 4—4 of FIG. 2;

FIG. 5 is a similar view to FIG. 4 showing a structure having two stop positions; and FIG. 6 is a view similar to FIG. 1 showing an actuator structure for stopping the output at a precise rotational position upon demand.

Figure 2:
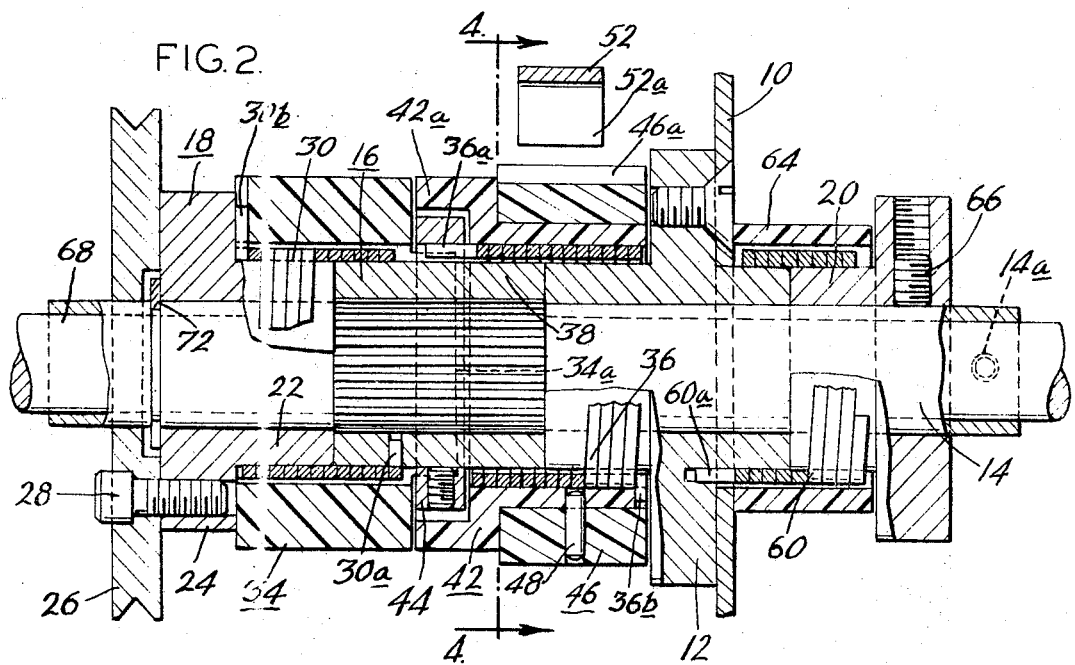
FIG. 2 is an axial sectional view of the clutch brake structure of FIG. 1 taken along line 2—2 of FIG. 1.

Referring first to FIG. 2 it will be observed that a reference frame is provided in this case by a frame plate 10, which may be fixed relative to surrounding structure of machinery or other apparatus in which the clutch brake is employed. Fixed to the frame plate 10 is a frame hub structure 12, the function which will be explained hereafter in further detail. The frame hub, among other things, is an inner bearing surface which provides a good rotational fit with tubular shaft 14, which is rotatable relative to the frame. Tubular shaft 14, in turn, has fixed to it an output hub 16. Output hub 16 may advantageously be fixed to the shaft by press fitting over surface splines. Also rotatably supported along shaft 14 is input hub 18. On the other side of the frame plate 10, shaft 14 supports anti-back-up hub 20 which is fixed to and therefore rotates with shaft 14. Hubs 12 and 18 are preferably made of bearing material to facilitate their rotation relative to shaft 16 and accommodate the action of springs on their outer surfaces.

The nature of the reference frame and its relationship to the tubular rotatable shaft is described in greater detail in U.S. Pat. No. 3,373,851 to John S. Baer.

Input hub 18 includes a tubular portion 22 and a radially outwardly extending flange 24. The outer surface of tubular portion 22 provides a cylindrical clutch surface for engagement by a clutch spring. The outer face of flange 24 remote from the frame plate may be bolted by bolts 28 to an input drive coupling member, such as a pulley 26, or other suitable input coupling member.

A helical clutch spring 30 couples the input hub 18 to the output hub 16 and the spring is designed to normally engage the outer cylindrical face of tubular portion 22 of the input hub 18 and the adjacent portion of outer cylindrical face of output hub 16. These cylindrical surfaces of the input and output hubs are preferably of the same diameter. The clutch spring 30 is affixed to the output hub 16 by a tang 30a at one end. At the other end clutch spring 30 radially outwardly directed tang 30b is held in a radial slot in clutch control member 34, which is preferably a collar. Since the clutch spring 30 is normally engaged with the cylindrical surfaces of the input hub 18 and the output hub 16, the spring has a normally engaged or drive condition and release is achieved by relative movement of the clutch control member 34 and the output hub in such a direction as to expand the spring 30 outwardly. This is done by stopping clutch control member 34 so that the spring must be of such hand that the continued rotation of the input hub will expand and release the clutch. The input hub is free to continue running upon release of the spring since the spring is connected between the clutch control member and the output hub. It should be noted that while attachment to the ouput hub is essential, the engagement of the clutch surface of the output hub 16 is not essential, but in preferred embodiments both input and output hubs are provided with cylindrical surfaces for clutch engagement.

In accordance with the present invention in order to actuate the clutch, actuator means is provided to disengage the clutch and essentially simultaneously brake the output hub so that it will retain its position at the moment selected for declutching. In FIG. 2 control collar 34 is rotating. If control collar 34 is stopped, the input and output hubs move slightly further, to engage the brake as the clutch is simultaneously released. In the embodiment shown, braking is accomplished by providing a helical spring 36 which is normally disengaged and is engaged by means hereafter described and which acts when engaged to brake the output hub 16 by connecting it to the frame hub 12. Brake spring 36 is connected by tang 36a to a portion of output hub 16 designated rotatable brake hub 38 which provides cylindrical surface adjacent the frame hub 14 and is preferably engaged by the brake spring 36 as it is tightened in braking. The brake hub 38 can, of course, be made a separate piece from the output hub. However, the structure of the present invention lends itself advantageously an output hub 16 which serves both as output and rotatable brake hub. Since the brake spring 36 is fixed to the portion of the output hub 16 by tang 36a no rotatable brake hub 38 for engaging spring 36 would have to be provided. On the other hand the frame hub cylindrical brake surface is essential since the brake spring 36 is not attached to frame hub 12 in any other way. The other end of the brake spring 36 is attached by tang 36b to brake control member 42. Attachment of tang 36a to the brake hub 38 is accomplished using a ring 44 which is attached to output hub 16 by set screws or other suitable means and offers a convenient way of adjusting brake spring 36 relative to clutch spring 30 to insure optimum operation and to adjust for wear.

Figure 3:
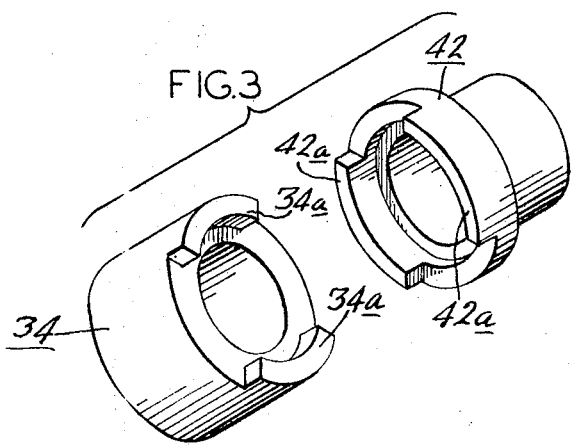
FIG. 3 is an exploded perspective view showing the nature of the coupling between the brake collar and the control collar.

In this particular case, as best seen in FIG. 3, brake control member 42 and clutch control member 34 have inter-engaging portions 42a and 34a, respectively, which provide a snug rotational fit so that the two control members operate as though they were a single piece. They are made in separate pieces, however, to facilitate assembly as described below. Other means of coupling, of course, can be employed, such as a pin or pins between the clutch and brake control members.

Figure 1:
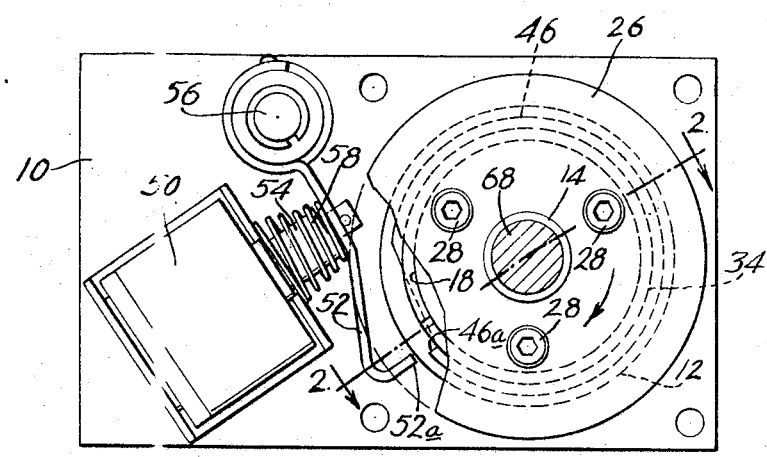

The arrangement described thus far, without additional structure described hereafter, can be used thereby taking advantage of the improvements described in the structure illustrated. A brake shoe, a brake band, or similar means, can be used, for example, to stop the output whenever desired. However, in order to provide the feature of stopping precisely at the same point each time, the further refinement of a rotatable stop is required. Since the brake control member 42 rotates whenever the clutch is engaged as seen in FIG. 2 and is connected to the output hub through the brake spring 36, the position of the brake control collar 42 is indicative of the position of the output hub. Therefore, it is possible to put a rotatable stop member on the brake control member as an index means to stop the output hub in a predetermined position relative to the frame. A preferred means of providing the rotatable stop as seen in FIGS. 1, 3 and 4 is to provide still another collar, stop collar 46, which is fixed to and acts upon the brake control member 42. The stop collar 46 is therefore provided to be rotatable with respect to brake control collar 42 to place the stop shoulder 46a in predetermined relationship to an indexing hole 14a in tubular shaft 14 and thereafter pinned in position when that relationship is attained. The brake control member 42 stops when stop collar 46 is stopped because they are pinned together by pin 48. The pin is put in place during manufacture in accordance with instructions from the user in order to establish indexing relationships between the stop shoulder 46a on the stop collar and the position of the output shaft. When brake control member 42 is stopped, the clutch control member 34 is also stopped. The essentially simultaneous unwinding of the clutch spring 30 and the wrapping down of the brake spring 36, causes essentially simultaneous declutching of the input from the output hub and stopping of the output hub 38 in the predetermined portion a very small and precisely repeatable angular position beyond that of the stopped clutch and brake control members 42 and 34.

FIG. 4 shows an actuator arrangement for the clutch brake which provides a single revolution clutch. In this particular structure a rotatable stop, in the form of a shoulder, provides means of precise indexing as to where the output will be stopped. The actuator is shown with the stops out of engagement so that the clutch is engaged. Starting from the precisely indexed position of the shoulder, rotational stop 46a, the output will make one full revolution and the output will then stop at precisely the same position defined by shoulder 36a, from which it started. The actuator for the clutch illustrated includes a solenoid 50 which isenergized by closing a switch to connect it to a power supply. Energizing the solenoid will draw solenoid magnetic core 54 into the solenoid winding and move stop lever 52 about its pivot point 56 of rotational attachment to the frame 10 (from the dashed line to the solid line position). Helical compression spring 58 surrounding the plunger 54 and extending between the solenoid winding 50 and the lever 52 ordinarily urges stop lever 52 into the stop position illustrated in dashed lines. The free end 52a of stop lever 52 against stop collar 46 so that intercepting stop 52a is urged by spring 58 into the path of shoulder 46a, which constitutes a rotatable stop and the contact of the two stops 46a and 52a stops the output in a predetermined rotational position.

In operation, the solenoid is energized briefly to cause withdrawal of the stop lever 52 into the position shown in FIG. 4 in dotted lines thereby releasing intercepting stop 52a from shoulder 46a and permitting further rotation of stop collar 46, brake and clutch control members 24 and 42 and output hub 16. Immediate deenergization of the solenoid allows spring 54 to urge the lever 53 against stop collar 46 so that intercepting stop 52a is thereby positioned in the path of rotatable stop 46a and rotation of the output hub continue only until these stops contact, at which point the output will stop in its precisely preselected position.

In the modified structure of FIG. 5 the stop collar in this particular case has two stop shoulders 46a' and 46b' so that if the solenoid is immediately de-energized after release from one, the other rotational stop will stop the output hub at a second preselected position. When the stop collar 46' rotates to the position where stop 46b' engages intercepting stop 52a'', the output will be stopped in the same manner, as when stop 46a' is engaged but at a different preselected position. Thus, in the embodiment of FIG. 2 in the course of each revolution two stops will be made. The positions selected by the stops can be equally spaced apart or made at any other desired angular position, relative to one another. Additional stops can be provided and they can be symmetrically arranged at equal angles to one another or arranged in any other desired pattern.

It is also possible to modify the actuator as shown in FIG. 6 to permit any number of rotations to occur and stop the output hub of the clutch brake at a preselected position. This can be done at random or after a predetermined number of revolutions. In this application the stop lever 52'' pivoted to the frame 10'' at pivot point 56'' is normally urged out of engagement with the stop collar 46'' by action of spring 54'', as seen in solid lines. A timer, or suitable sensing means and counter, can be used to determine the number of revolutions desired before energizing the solenoid. In a given case, the number of revolutions may not be critical, but rather the criticality may be only that, when stopped, the output stops at a desired position. In either event, the solenoid winding 50'' is energized by appropriate means to place intercepting stop 52a'' into the path of rotatable stop 46a'' as seen in FIG. 6 in dashed lines. Here again there could be more than one rotatable stop. If there is only one such stop 46a, the timing is, of course, less critical than if there are two or more rotatable stops. However, once the solenoid is energized and the intercepting stop 52a'' brought into the path of the rotatable stop 46a'', the stopping of the output hub will occur just as described above.

In order to prevent the output hub from backing up under the urging of brake spring 36, it is desirable to provide an anti-back-up spring 60 fixed to the frame 10 by tang 60a and snugly surrounding and tending to wrap down on at least anti-back-up hub 20. As previously mentioned anti-back-up hub 20 is fixed to the shaft 14 just as output hub is so that action on hub 20 is effectively action on output hub 16. The hand of the anti-back-up spring 60 is such that it will permit slippage of the anti-back-up hub 20 easily in the direction of normal rotation, but will immediately clamp down and prevent rotation in the other direction. The frame hub is extended toward a cylindrical portion of anti-back-up hub 20 and the adjacent hubs are provided with cylindrical surfaces of approximately the same diameter upon which the anti-back-up spring 60 rides. It is not essential in all cases to use the frame hub portions but it is preferably to do so. In order to avoid leaving anti-back-up spring 60 exposed, a cover 64 may be employed if desired. The anti-back-up hub 20 is fixed to the tubular shaft 14 by set screw 66 holding it in place relative to the shaft and may therefore be used as an output coupling. Preferably, however, output is taken through tubular shaft 14 connected to shaft 68 passing through the tubular shaft by a pin 14a passing through and connecting together shaft 68 and tubular shaft 14.

The illustrated position and arrangement for an anti-back-up spring is only one of many possible arrangements, as will be clear to one skilled in the art. For example, such a spring could alternatively be placed along tubular shaft 14 within a counterbore in hubs 12 and 16. The spring is out of contact with the shaft and its outer diameter in contact with hubs 12 and 16 tends to expand. The spring is of such hand that normal rotation is not impeded because it tends to act to reduce spring diameter whereas backup rotation tends to expanding the spring and lock together the two hubs 12 and 16.

Assembly may be begun by placing output hub 16 on shaft 14. Next tang 30a of the clutch spring 30 is fixed to output hub 16. Clutch control member 34 is then slid over the output hub into position to place tang 30b in the hole provided. Input hub 22 may then be placed over the shaft 16 and inserted within the spring 30. Ring 44 is placed in position on output hub 16 and fixed in place by set screws. The input hub is held in place by snap ring 72.

Stop collar 46 is assembled with stop spring 48 and in turn this assembly is positioned over brake control member 42. Brake spring 36 is then added within the brake control member 42, placing it radially outwardly extending tang 36b into the slot in brake control member 42. This whole assembly is then positioned over portion 38 of hub 16 and tang 36a inserted into the slot in ring 44. This subassembly can then be combined with the frame plate assembly which has frame hub 12 in position and the solenoid and actuator assembly 50, 52, etc., in place by sliding the hollow shaft 14 through the frame hub 12 until hub portions 40 and 38 abut one another.

The anti-back-up spring 60 is next assembled over the frame hub 64 with its tang 60a inserted into the frame plate 10. Cover 64 is inserted in position and anti-back-up hub 20 is put in place and pinned to the shaft 70. The pinning not only fixes the hub 20 to the shaft so that the output may be transmitted from hub 16 through the shaft to hub 20, but also holds the structure to the frame 10.

Various structural modifications have been described

I claim:
1. A clutch brake comprising:
a frame,
an input hub rotatably supported relative to the frame, connectable to suitable drive means and provided with a coaxial cylindrical clutch surface,
an axially aligned output hub rotatably supported relative to the frame, connectable to driven apparatus,
a helical clutch spring generally coaxial with and normally in engagement at least with the clutch surface of the input hub, one end of said spring being affixed to the output hub, the hand of the clutch spring being selected so as to cause the clutch spring to wrap tighter on the input hub as the result of driving by the input hub,
a clutch control member affixed to the other end of the clutch spring and acting, when stopped, to unwrap the clutch spring from the input hub to thereby disengage said input and output hubs one from another,
a frame hub fixed to the frame and having a cylindrical surface coaxial with the axis of rotation of the input and output hubs,
a helical brake spring connected at one end to move with the output hub, surrounding at least part of the frame hub and normally out of engagement with the frame hub cylindrical surface,
a brake control member affixed to the other end of the brake spring and movable relative to the frame with the output hub and having at least one rotatable generally radially extending stop surface providing a positive stop,
mechanical coupling between the brake control member and the clutch control member whereby stopping the brake control member will immediately stop the clutch control member, and
actuator means on the frame and extending between the frame and the brake control member selectively to stop the brake control member relative to the frame precisely in at least one preselected position, said actuator means including an intercepting stop element movable into the path of the at least one rotatable generally radially extending stop surface so as to positively stop the brake control member in an exact predetermined angular position and acting essentially simultaneously on the clutch control member and on the brake to upwrap the clutch from the output hub as the brake is wrapped down on the frame hub.

2. The clutch brake of claim 1 in which the intercepting stop is spring urged into the path of the at least one generally radially extending stop surface to normally engage at least one stop surface and selectively removable from such engagement to allow release of the braking and re-engagement of the clutch.

3. The clutch brake of claim 2 in which the intercepting stop after release is immediately again urged into the path of a rotatable generally radially extending stop surface and upon contact will again disengage the clutch and brake the output hub until again selectively removed.

4. The clutch brake of claim 3 in which selective removal of the intercepting stop is by a solenoid actuator.

5. The clutch brake of claim 1 in which the intercepting stop is an element spring urged away from a rotatable generally radially extending stop surface and selectively movable into the path of engagement of at least one rotatable generally radially extending stop surface.

6. The clutch brake of claim 5 in which each of the at least one rotatable stop is provided by a discontinuity in an otherwise smooth track provided on the periphery of the brake control member.

7. The clutch brake of claim 1 in which the brake control member is a collar having an outer cylindrical surface and the at least one rotatable generally radially extending stop surface is on the coaxial stop collar surrounding the cylindrical surface and connected thereto by a helical stop spring, said stop spring having one end fixed to the stop collar and being of such hand as to clamp more tightly onto the cylindrical surface of the brake control member when the intercepting stop bears against and stops a rotatable stop on the stop collar.

8. The clutch brake of claim 2 in which each of the at least one rotatable generally radially extending stop surface is provided by a discontinuity in an otherwise smooth track provided on the periphery of the brake control member.

9. The clutch brake of claim 8 in which there is only one such rotatable generally radially extending stop surface.

10. The clutch brake of claim 8 in which there are more than one such rotatable generally radially extending stop surfaces.

11. The clutch brake of claim 10 in which there are two such rotatable stops.

References Cited

UNITED STATES PATENTS

| | | | |
|---|---|---|---|
| 2,298,970 | 10/1942 | Russel et al. | 192—33 |
| 2,669,331 | 2/1954 | Dudis et al. | 19—33 XR |
| 2,885,042 | 5/1959 | Frechette. | |
| 3,181,669 | 5/1965 | Kunde et al. | 19—81 |
| 3,228,497 | 1/1966 | Shneider. | |
| 3,263,459 | 8/1966 | Bochan et al. | |
| 3,425,526 | 2/1969 | Baer. | |

BENJAMIN W. WYCHE III, Primary Examiner

U.S. Cl. X.R.

188—82.6; 192—26, 33